United States Patent
Moran et al.

(10) Patent No.: US 10,691,547 B1
(45) Date of Patent: Jun. 23, 2020

(54) BACKUP AND RECOVERY FOR END-USER COMPUTING IN VIRTUAL DESKTOP ENVIRONMENTS

(71) Applicant: EMC IP Holding Company LLC, Hopkinton, MA (US)

(72) Inventors: John M. Moran, Mebane, NC (US); Ka-Kit Wong, Kowloon (HK)

(73) Assignee: EMC IP Holding Company LLC, Hopkinton, MA (US)

( * ) Notice: Subject to any disclaimer, the term of this patent is extended or adjusted under 35 U.S.C. 154(b) by 539 days.

(21) Appl. No.: 15/076,034

(22) Filed: Mar. 21, 2016

(51) Int. Cl.
G06F 11/14 (2006.01)

(52) U.S. Cl.
CPC ...... *G06F 11/1438* (2013.01); *G06F 11/1451* (2013.01); *G06F 11/1453* (2013.01); *G06F 11/1464* (2013.01); *G06F 2201/815* (2013.01)

(58) Field of Classification Search
CPC ............. G06F 11/1438; G06F 11/1451; G06F 11/1453; G06F 11/1464
USPC ........................................................ 707/645
See application file for complete search history.

(56) References Cited

U.S. PATENT DOCUMENTS

| | | | | |
|---|---|---|---|---|
| 7,584,225 B2 * | 9/2009 | Jiang | ................... | G06F 11/1451 |
| 8,849,777 B1 * | 9/2014 | Xing | ................... | G06F 11/1453 |
| | | | | 707/695 |
| 2007/0171921 A1 * | 7/2007 | Wookey | ................ | G06F 3/1415 |
| | | | | 370/401 |
| 2010/0070978 A1 * | 3/2010 | Chawla | ................. | G06F 9/5077 |
| | | | | 718/105 |
| 2011/0016467 A1 * | 1/2011 | Kane | .................... | G06F 9/45558 |
| | | | | 718/1 |
| 2013/0262390 A1 * | 10/2013 | Kumarasamy | ...... | H04L 41/0846 |
| | | | | 707/649 |
| 2016/0371104 A1 * | 12/2016 | Zamir | ................. | G06F 9/45533 |
| 2017/0168861 A1 * | 6/2017 | Dhawan | .............. | G06F 9/45558 |

OTHER PUBLICATIONS

VMware,"VMware View Backup Best Practices", Deployment and Technical Considerations Guide, Sep. 2011, 21 pages printed. (Year: 2011).*
O'Doherty et. al., "VMware Horizon Suite—Building End User Services", 2014, VMware, 87 pages (Year: 2014).*

* cited by examiner

*Primary Examiner* — Tony Mahmoudi
*Assistant Examiner* — Michael Le
(74) *Attorney, Agent, or Firm* — Staniford Tomita LLP

(57) ABSTRACT

A system and method of performing backups of a system having persistent and non-persistent virtual desktop infrastructure components, database storage components, and file management components. The method first backs up the file management components, then a database server of the database storage components, and then the virtual desktop infrastructure components in an order of a virtual center server, connection server, and then a composer server. If the virtual desktop environment is non-persistent, the system backs up a master image that is used to create non-persistent desktops, and if the virtual desktop environment is persistent, the system backs up the master image that is used to create non-persistent desktops and virtual storage objects that maintain persistence of an identity of the virtual desktop environment.

14 Claims, 9 Drawing Sheets

| MAIN INFRASTRUCTURE COMPONENT | SPECIFIC INFRASTRUCTURE COMPONENT |
|---|---|
| AD/DNS/DHCP Server 402 | Active Directory |
| | DNS Server |
| | DHCP Server |
| Database Server 404 | SQL Server Database |
| | Oracle Database |
| vCenter 406 | VCenter Server |
| View Connection 408 | View Connection Server |
| View Composer 410 | View Composer Server |

FIG. 4

| VIRTUAL DESKTOP TYPE | VIRTUAL DESKTOP COMPONENTS REQUIRING BACKUP |
|---|---|
| NON-PERSISTENT 602 | The master desktop image that is used to create the non-persistent desktops |
| PERSISTENT 604 | (1) The master desktop image that is used to create the non-persistent desktops<br><br>(2) The virtual storage objects that maintain the persistence of the desktop's identity |

FIG. 6

| MAIN INFRASTRUCTURE COMPONENT | SPECIFIC INFRASTRUCTURE COMPONENT |
|---|---|
| AD/DNS/DHCP Server 802 | Active Directory |
| | DNS Server |
| | DHCP Server |
| Database Server 804 | SQL Server Database |
| vCenter 806 | VCenter Server |
| Delivery Controller 808 | Delivery Controller |
| Provisioning Services 810 | Provisioning Services Database |
| | Provisioning Services vDisk |

| PROVISIONING TYPE | VIRTUAL DESKTOP TYPE | VIRTUAL DESKTOP COMPONENTS REQUIRING BACKUP |
|---|---|---|
| MCS 902 | NON-PERSISTENT | The Master Virtual Machine |
| | PERSISTENT | (1) The Master Virtual Machine<br><br>(2) The Personal vDisk |
| PVS 904 | NON-PERSISTENT | The Master vDisk |
| | PERSISTENT | (1) The Master vDisk<br><br>(2) The Personal vDisk |

FIG. 9

BACKUP AND RECOVERY FOR END-USER COMPUTING IN VIRTUAL DESKTOP ENVIRONMENTS

TECHNICAL FIELD

Embodiments are generally directed to networked-based data backup, and more specifically to protecting virtual desktop environments against failures and optimizing restores of the virtual desktop space.

BACKGROUND

Virtual desktop environments provide significant business value by enabling companies to centralize management of the desktop experience and provide new ways for employees to access their information. This kind of system is composed of multiple interlocking technologies and, without proper planning, can be difficult to protect from common failure scenarios that are covered by traditional backup approaches in legacy desktop environments. End-user computing (EUC) provides many benefits to IT organizations, including reduced costs, centralized desktop management, increased workforce agility and mobility, and decreased data center footprints. As the total amount of data stored for virtual desktops that share common resources increases, traditional backup solutions have trouble meeting backup windows, putting data integrity and business continuity at risk.

New deduplication products such as the EMC Avamar® system provide the tools needed to protect virtual desktop environments from a wide range of failures by enabling the backup and recovery of the individual components of desktop infrastructure. Such virtual desktop environments have certain key components that need to be backed up in a way that maintains the critical relationships between them, and that facilitate efficient data restore operations in the virtual desktop space. One challenge with virtual desktops and virtual machines in general is that backups are not always straightforward since virtual machines are constructed dynamically or on-the-fly during runtime operations. Such virtual machines thus represent non-persistent sources with respect to customized data such as customizations of user settings or applications. After system restarts or user log off, such customizations are lost in non-persistent systems.

What is needed, therefore, is a method for protecting end-user computing (EUC) environments during backup operations in a way that facilitates efficient restore operations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, Data Domain Boost, and Avamar are trademarks of EMC Corporation; VMware Horizon View is a trademark of VMware Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 is a table that lists the virtual desktop infrastructure components that require backup under some embodiments.

FIG. 6 is a table that illustrates the virtual desktop components that require backup based on the desktop type.

FIG. 8 is a table that lists the virtual desktop infrastructure components of the system of FIG. 7 that require backup under some embodiments.

FIG. 9 is a table that illustrates the virtual desktop infrastructure components that require backup based on desktop type for system of FIG. 7 under some embodiments.

DETAILED DESCRIPTION

Figure 1:
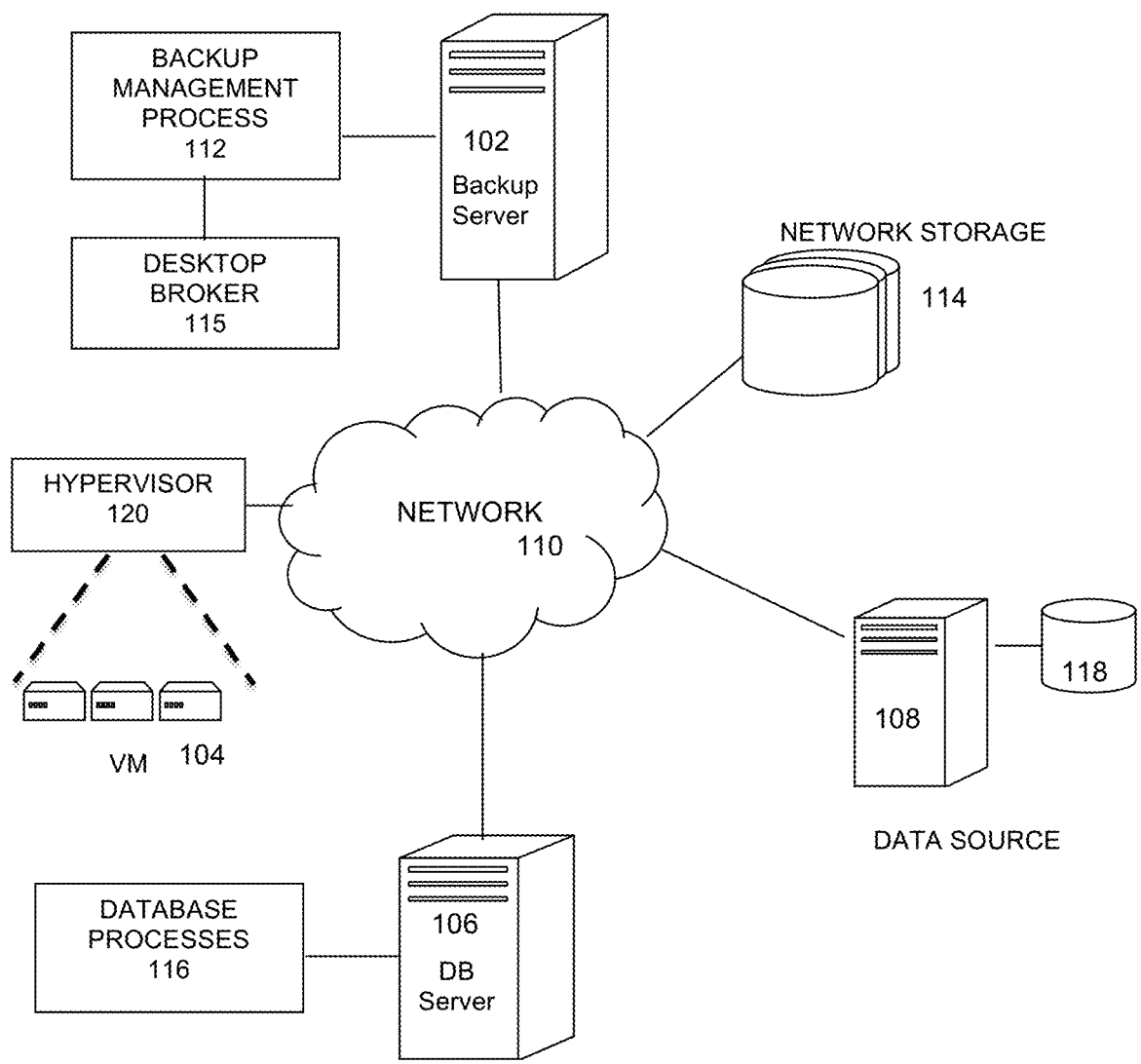
FIG. 1 illustrates a computer network system that implements one or more embodiments of a large-scale network implementing a backup/restore process for virtual desktop environments, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method for optimizing backup and restore operations in virtual desktop environments. In an embodiment, the underlying backup system may be a variable length deduplication system that stores unique daily changes while maintaining daily full backups for immediate, single-step restores to facilitate fast, daily full backups for virtual environments, remote offices, enterprise applications, network-attached storage (NAS) servers, and desktop/laptop computers. The backup system is used with a desktop broker or desktop virtualization product that provides remote-desktop capabilities to users using virtualization technology. Examples of such desktop brokers include VMware Horizon® View™ and Citrix Xen-Desktop, and other similar products.

FIG. 1 illustrates a computer network system that implements one or more embodiments of a large-scale network implementing a backup/restore process for virtual desktop environments, under some embodiments. In system 100, a backup server 102 executes a backup management process 112 that coordinates or manages the backup of data from one or more data sources 108 to storage devices, such as network storage 114, client storage 106, and/or virtual storage devices 104. With regard to virtual storage 114, any number of virtual machines (VMs) or groups of VMs may be provided to serve as backup targets, and the target VMs may also be organized into one or more vCenters (virtual centers) representing a physical or virtual network of many virtual machines. The VMs or other network storage devices serve as target storage devices for data backed up from one or more data sources, such as computer 108, which may have attached local storage 118 or utilize networked accessed storage devices 114.

The virtual machines 104 may be managed by a hypervisor 120 that represents a component or process that allows multiple operating systems to share a single hardware host. The hypervisor is a host machine that runs the virtual machines 104 and presents the guest operating systems of the VMs with a virtual operating platform and manages the execution of the guest operating systems. A desktop broker component 115 provides remote-desktop capabilities to users using virtualization technology implemented by the hypervisor 120.

The network server computers are coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to storage devices of the network, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (Open-Storage) devices.

The data sourced by the data source may be any appropriate data, such as database data that is part of a database management system. In this case, the data may reside on one or more hard drives (e.g., 118) and may be stored in the database in a variety of formats. One example is an Extensible Markup Language (XML) database, which is a data persistence software system that allows data to be stored in XML format. Another example is a relational database management system (RDMS) which uses tables to store the information. A separate computer 106 may represent a database server that instantiates a program that interacts with the database through one or more database processes 116. Each instance of a database server may, among other features, independently query the database and store information in the database, or it may be an application server that provides user interfaces to database servers, such as through web-based interface applications or through virtual database server or a virtual directory server applications.

In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery.

In an embodiment, system 100 implements a deduplication backup process 112 for EUC implementations. One example of such a system is the EMC Avamar system, though others are also possible. This type of system is an integrated solution that addresses certain challenges associated with traditional backup in next-generation data centers. Unlike traditional backup solutions, process 112 identifies redundant data segments at the client before they are transferred across the network. By moving only new and unique sub-file data segments, systems such as Avamar deliver fast daily full backups while significantly reducing the required daily network bandwidth (e.g., by up to 99 percent). This capability allows companies to use existing network bandwidth for backup and data restores of remote offices and data centers, despite slow or congested networks and infrastructure. Process 112 can encrypt data both in flight and at rest for added security, and centralized management makes it easy to protect hundreds of remote offices efficiently. It provides client-side data deduplication with extremely fast and efficient backup and recovery. Process 112 protects virtual machines by deduplicating data at the client, so that only new, unique, sub-file, variable-length data segments are sent during daily full backups. Where traditional backup software may move more than 200 percent of the primary backup data on a weekly basis, process 112 moves as little as two percent over the same seven-day period, removing backup bottlenecks and enabling even greater levels of end user experience. Such a system enables organizations to deploy a deduplication backup system optimized for EUC environments, and addresses the challenges associated with backup and recovery for virtualized desktops in desktop broker 115. Process 112 employs true variable-length deduplication to dramatically reduce backup times and backup storage; and although it only needs to back up unique daily changes, it stores the data in a full daily format to enable file-level restores in a single step.

In an embodiment, backup management process 112 uses a data store to deploy the physical storage server 102. This combines hardware and deduplication backup and recovery software in a fully integrated, scalable, purpose-built backup appliance. The data store eliminates the inconvenience and complexity of working with multiple vendors for hardware, software, and support. This represents a turnkey solution that significantly reduces on-site setup time, while providing a single point of contact for purchasing, deployment, and service.

The backup management process includes client software and plug-ins to virtual desktops in EUC environments to implement backup and recovery capabilities and enable end users to recover their own data without IT staff intervention. The client software and plug-ins manage applications and can scale across an entire organization, while the integrated data deduplication process 112 uses existing network links.

As stated above, the backup process 112 includes an integrated deduplication that reduces the size of backup data before it is transferred across the network and stored to disk. This allows fast, daily full backups using existing network links, without the need for a dedicated, high-speed network data management protocol (NDMP) backup network. In an embodiment, the system uses an NDMP accelerator node in which a level-0 backup is performed only once, during the initial full backup. Subsequent daily full backups are achieved by requesting only level-1 incremental dumps. This reduces backup times and the impact on NAS resources and networks. In an embodiment, system 100 is a Data Domain system comprising disk-based inline deduplication appliances that provide data protection and DR in the enterprise environment. Source-based deduplication to the Data Domain system is facilitated through a Data Domain Boost library to enable process 112 to control backup images stored on Data Domain systems and to manage maintenance activities and control replication to remote Data Domain systems.

Figure 2:
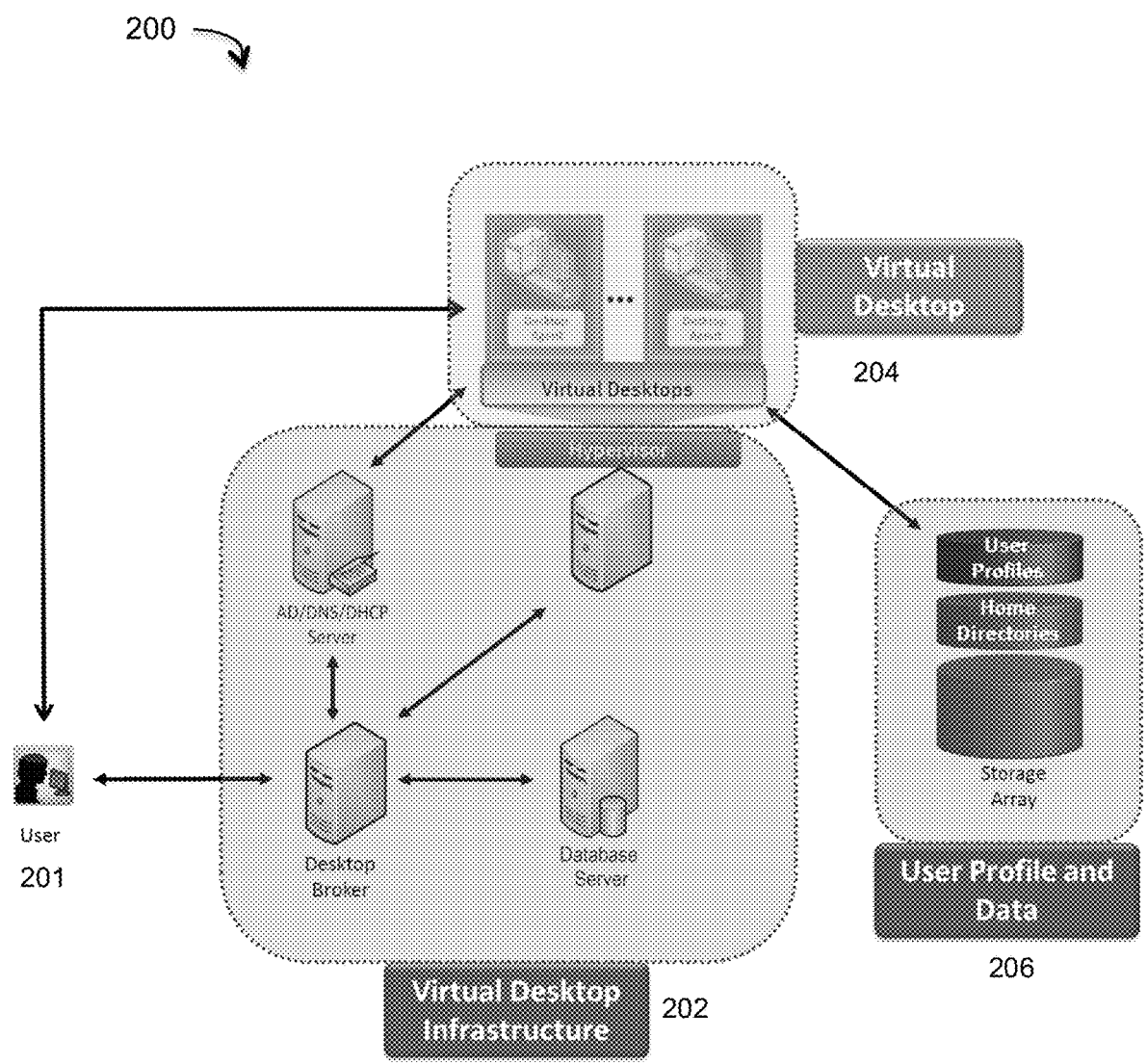
FIG. 2 illustrates an end-user computing architecture that implements a backup and recovery process under some embodiments.

As shown in FIG. 1, system 100 includes a virtual desktop environment using virtual machines or virtual machine centers as network nodes in an EUC architecture. FIG. 2 illustrates an end-user computing architecture that implements a backup and recovery process under some embodiments. The EUC architecture 200 typically encompasses components that require backup and recovery to protect a desktop environment, including: a virtual desktop infrastructure 202, virtual desktop 204, and user profile and data 206. The virtual desktop infrastructure includes a desktop broker and one or more servers for database functions and file/data management functions. A hypervisor interfaces with the individual VM virtual desktops (running respective agents) that comprise the virtual desktop 204. The user 201 interacts with the desktop broker interface to access the virtual desktop client agents. User profile and data for user 201 is stored in a storage array that contains user profile data stored in appropriate directories.

With respect to the virtual desktop infrastructure, active directory, DNS (domain name service), and DHCP (dynamic host configuration protocol) server or servers serve as the foundation of an EUC environment. The active directory is primarily used for domain authentication and policy enforcement for both users and computers while DNS is responsible for dynamic host name resolution for the virtual desktops and DHCP automates their dynamic IP assignments. These servers can reside on the same system or on multiple systems for redundancy and scalability purposes. The virtual desktop infrastructure of an EUC environment comprises the desktop brokers to handle desktop lifecycle management and, optionally, an external database system to keep track of the broker and desktop configurations.

Virtual desktops can generally be categorized as either non-persistent or persistent. For purposes of this description, non-persistent means that customizations of user settings or applications are lost after logoff or restart. Persistent desktops preserve user or application customizations after logoff or restart.

Operating system (e.g., Microsoft Windows) user profiles 206 contain custom user settings and folders that can reside locally on a desktop (local profiles) or be redirected to a NAS repository (roaming profiles). Desktop broker technology may provide its own built-in profile management that coexists with or enhances a Windows roaming profile. As an alternative to the redirected folders in user profiles, one can create home directories to centrally store user data in a NAS repository.

In an embodiment, the backup and recovery operations of process 112 should be implemented in accordance with system requirements and best practices. For example, if it is required to restore active directory data, an administrator should ensure that the active directory is fully restored and synchronized before proceeding with restoration of virtual desktops 204. In general, core infrastructure 202 services such as active directory, DHCP, DNS, and NTP must be fully operational before virtual desktop recovery can be completed. For non-persistent virtual desktops, the system should not attempt to back up the desktop environment directly. Instead, the master image is backed up and the desktop is re-provisioned on recovery. For persistent desktops, the system should decouple user settings and local installed applications from the desktop OS so that only user customization changes require backup. This helps to minimize the backup size and window.

For the user profile and data 206, profile redirection may be used (e.g., either roaming profiles or profile management from the desktop broker) to decouple the user environment from the desktop. This avoids the loss of user settings when the desktop broker updates the desktop image and enables a more streamlined recovery. User data may be mapped to a shared folder outside the desktop virtual machine so that the affected files can be protected by features designed for that use case. Although user profiles are created locally by default, profile redirection using roaming profiles or profile management provided by the desktop broker may be used. This makes it easier to protect the profiles when they are centrally managed. In addition, some profile management systems provided by the desktop broker include enhancements that minimize user logon time by accessing only a required portion of a profile, and address the "last write wins" issues that are inherent in roaming profiles.

Figure 3:
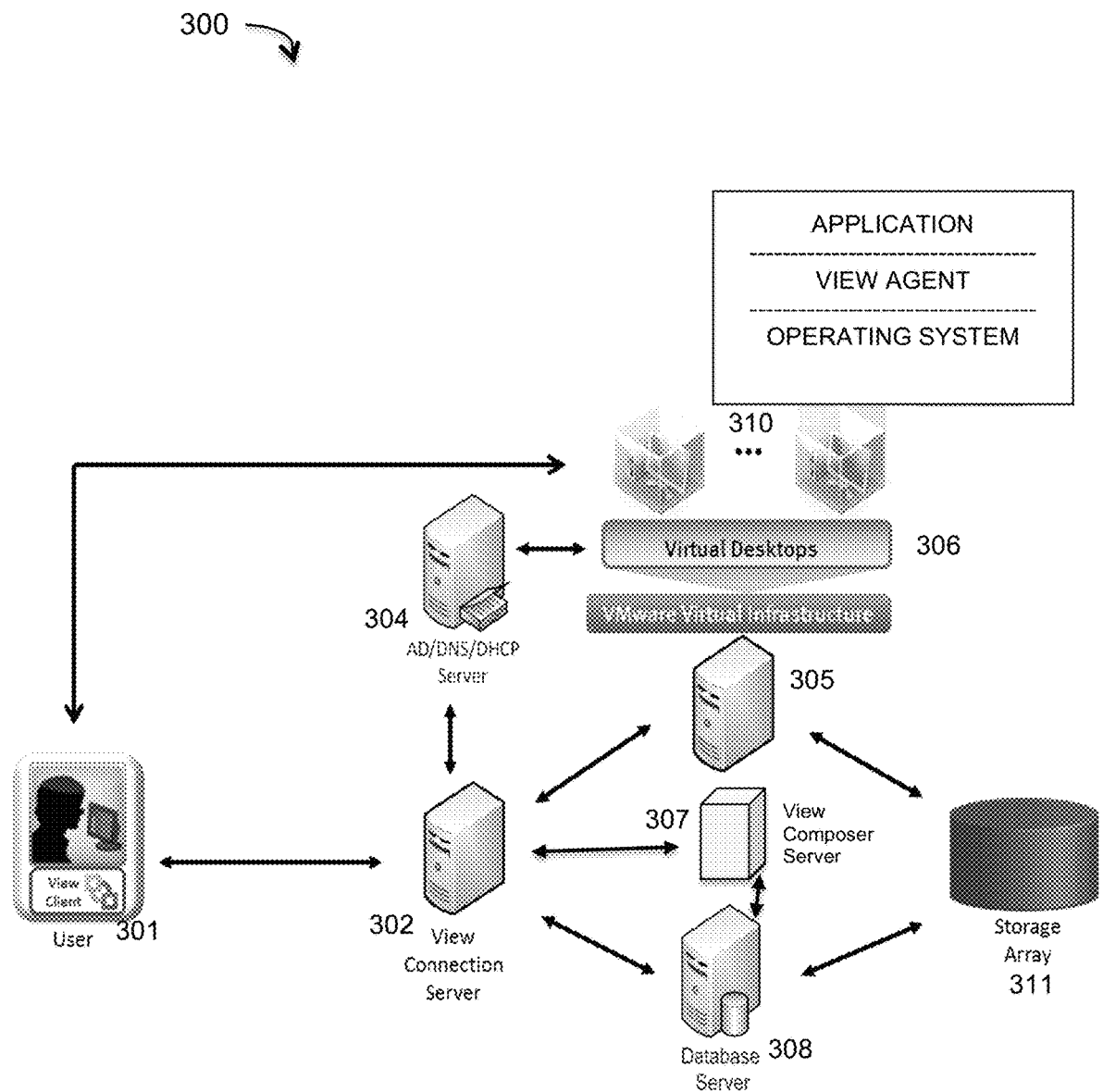
FIG. 3 illustrates an example desktop broker architecture under an embodiment.

The desktop broker within the virtual desktop infrastructure 202 provides personalized virtual desktops to end-users. With the desktop broker (e.g., VMware Horizon View), administrators can virtualize the OS, applications, and user data while gaining control, efficiency, and security by having desktop data in a data center. FIG. 3 illustrates an example desktop broker architecture under an embodiment. The example of FIG. 3 is directed to or contains reference to the VMware Horizon View desktop broker, but embodiments are not so limited, and other similar desktop brokers may also be used. For the embodiment of FIG. 3, the desktop broker has several components that work together to deliver a robust EUC environment. A view connection server 302 orchestrates the EUC environment 300. It assigns virtual desktops 306 to users, authenticates users, monitors the state of the virtual desktops, and starts and stops desktops based on demand and the administrative configuration. The AD/DNS/DHCP server 304 provides IP addresses to virtual desktops using DHCP and IP host name resolution using DNS. It also provides secure communication between users and virtual desktops using the active directory. The database server 308 stores the broker view, vCenter, and virtual desktop configuration information in a database.

The VMware virtual infrastructure 305 hosts the virtual desktops 306. A view composer server 307 uses certain built-in capabilities to manage and configure virtual desktops. The view composer is configured to allow multiple VMs to share common data in a single base disk while maintaining separate storage for the data written by each VM. A view agent 310 provides communication between view connection server 302 and the virtual desktops 306. It also provides a direct connection between virtual desktops and end users through the view client 301. The view client 301 (the user endpoint) communicates with the view connection server 302 and view agent 310 to authenticate and connect to the virtual desktop. The storage arrays 311 provide storage to the database and VMware virtual infrastructure, virtual desktop storage, and user data.

In an embodiment, the VDI system of FIG. 3 implements clone technology in which a clone is a copy of an existing or parent VM. When the cloning operation is complete, the clone becomes a separate VM with unique identity of its own. Clones may be full or linked. A full clone is an independent copy of a virtual machine that shares nothing with the parent once the cloning operation is complete: the ongoing operation of a full clone is entirely separate from its parent. A linked clone is a copy of a virtual machine that continues to share virtual disks with its parent. The differential (i.e., the bits of software that are unique to the linked clone) is stored in a "diff" disk or "redo" disk. This arrangement allows the linked clone to occupy a smaller virtual disk space than the parent yet still access software installed on the parent. Due to the sharing mechanism, however, a linked clone must always have access to the parent disk, without which it becomes unusable. Each linked clone can thus act like an independent desktop OS, with a unique personal identity, including unique hostname and IP address, but requires significantly less storage than a full clone.

During backup and restore operations, certain virtual desktop infrastructure components require backup in a certain specific order. FIG. 4 is a table that lists the virtual desktop infrastructure components that require backup under some embodiments. As shown in Table 400 of FIG. 4, the main infrastructure components to be backed up include the Active/DNS/DHCP server 402 (e.g., corresponding to server 304 in FIG. 3), the database server 404, and the vCenter 406, view connection 408, and view composer 410 servers. In an embodiment, the order or sequence in which the backup components are backed up is important. Thus, with reference to Table 400, the infrastructure components are backed up such that the active directory, DNS server, and DHCP server are backed up first. These can be backed up as one unit or individual units. Next, the database server 404 is backed up. Typically this will be one of a SQL, Oracle, or other database server. After this, the vCenter server is backed up followed by the view connection server, and then the view composer server.

Figure 5:
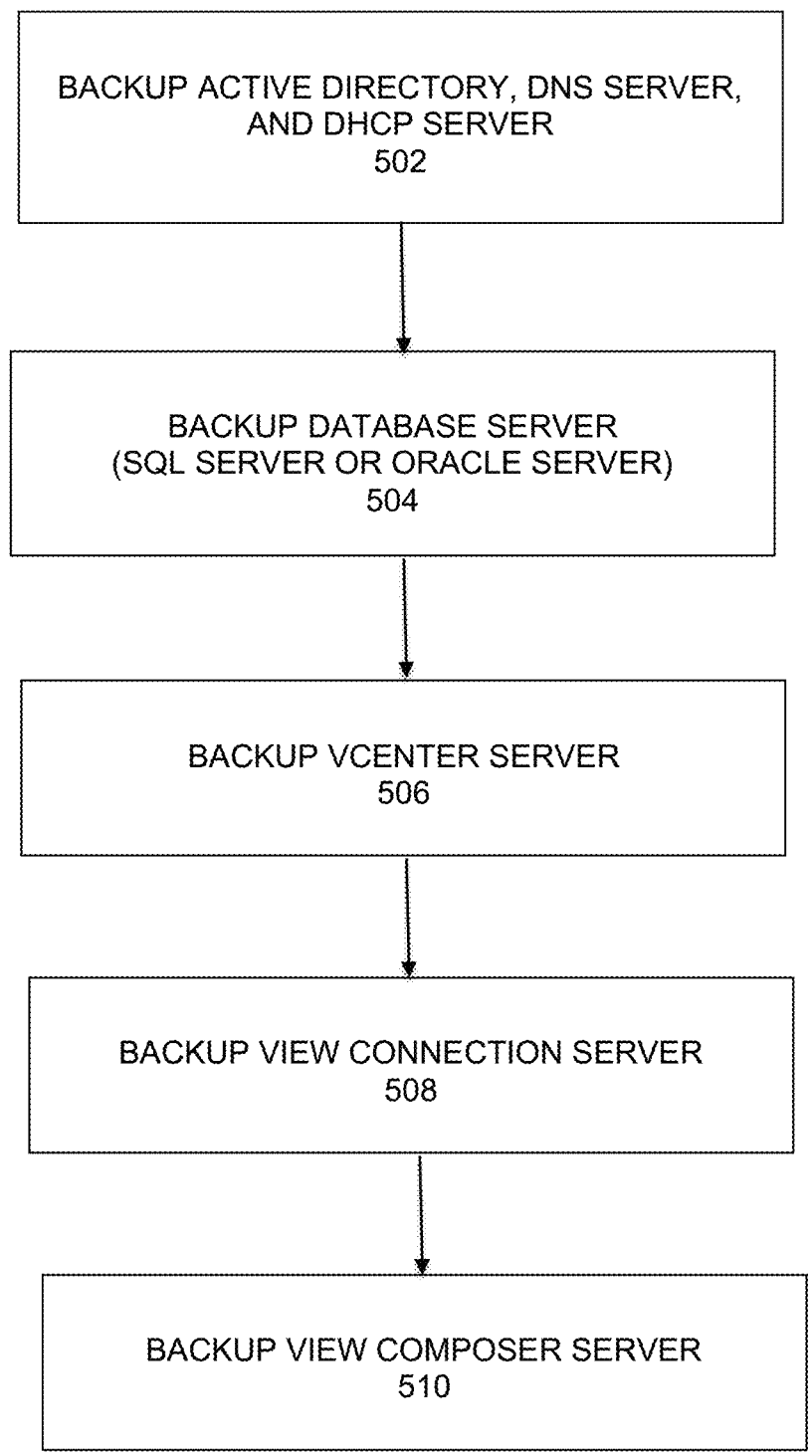
FIG. 5 is a flowchart that illustrates a method of performing backup of virtual desktop infrastructure components under some embodiments.

FIG. 5 is a flowchart that illustrates a method of performing backup of virtual desktop infrastructure components under some embodiments. Process 500 begins with the backup of the AD/DNS/DHCP server for the active directory, DNS, and DHCP servers, block 502. Next, either the SQL or Oracle database server is backed up, 504, then the vCenter server is backed up 506, followed by the view connection server 508, and the view composer server 510, in the order shown in FIG. 5.

Full recovery or restoration of the virtual desktop infrastructure components is typically done in the opposite order of the backup operations shown in FIG. 5. Thus, restore comprises restoring the view composer server, then restoring the view connection server, then the vCenter server. This is followed by restoring the database server (SQL or Oracle), and then the AD/DNS/DHCP server. In a partial-loss case, the recovery does not necessarily need to be in reverse order for all the steps. For example, if only a vCenter object is lost, only step 506 is required. If a View object is lost, 508 and 510 need to be restored together, but the order does not necessarily matter. Essentially, the grouping of steps involved is more important than the order.

With respect to the view composer component 410, view composer-linked clones are provisioned in one of three different ways. The first is floating user assignment in which each user is randomly assigned to a desktop from a non-persistent pool. The desktops are considered non-persistent and the user may be mapped to another desktop from the pool upon subsequent logins. There is no need to back up non-persistent desktops because of their disposable nature. As long as there is a backup for the master virtual machine, the snapshot of this VM can be used to regenerate the desktop pool. The second is a dedicated user assignment in which each user is always assigned to the same desktop, and user settings like Windows profiles may be redirected to a user data disk (also known as a persistent disk). If Windows profiles are redirected to the persistent disks, they need to be backed up in addition to the master virtual machine. Also, a persistent linked clone desktop could have unique data that is not stored in the persistent disk. In this case it is important to protect the entire desktop using a backup client running on the desktop. The third is a full clone in which each (persistent) desktop is an instantiation of a master virtual machine template. Once cloned, each desktop inherits a full copy of the master template and becomes an independent copy of that template.

For the view composer component, the floating user assignment (linked clone—floating) is a non-persistent type of virtual desktop, while the dedicated user assignment (linked clone—dedicated) and the full clone are both a persistent type of virtual desktop. Based on the main categories of non-persistent and persistent types of desktops, the virtual desktop components requiring backup are different. FIG. 6 is a table that illustrates the virtual desktop components that require backup based on the desktop type. As shown in FIG. 6, the virtual desktop types comprise non-persistent desktops 602 or persistent desktops 604. For non-persistent desktops, the component requiring backup is the master desktop image that is used to create the non-persistent desktops. For persistent linked-clone desktops, the components requiring backup are (1) the master desktop image that is used to create the non-persistent desktops, and (2) the virtual storage objects that maintain the persistence of the desktop's identity. For full clone desktops, the desktop virtual machines need to be backed up since they are independent instantiations of the master VM.

With respect to user profiles and data, persona management software may be provided that preserves user profiles and dynamically synchronizes them with a remote profile repository. In a Horizon View implementation, a persona management component typically does not require configuration of Windows roaming profiles, thus eliminating the need to use the active directory to manage View user profiles. In such a case all user profiles and home directories should be redirected to file shares that are centrally managed and protected. When these shares reside on NAS devices (e.g., VNX File or Isilon®), the backup system with an accelerator node can support file system backup and file-level restore for both platforms. Alternatively, a built-in file system snapshot capability can be used for both platforms to perform file-level restore.

Although embodiments are described with respect to the VMware Horizon View desktop broker, other types of desktop brokers may be used as well. One such alternative desktop broker is the Citrix XenDesktop architecture, which is intended to securely deliver any type of virtual desktop application to the latest personal computers, tablets, smartphones, laptops, and thin clients. This type of architecture has two provision methods: machine creation services (MCS) and provisioning services (PVS). MCS is a desktop provisioning mechanism that is integrated with Citrix Studio, the XenDesktop management interface, to provision, manage, and decommission desktops throughout the desktop lifecycle management from a centralized point of management. PVS uses the streaming technology to provision virtual desktops. PVS uses a single shared desktop image to stream across all the virtual desktops. This approach enables organizations to manage virtual desktop environment using fewer disk images.

Figure 7:
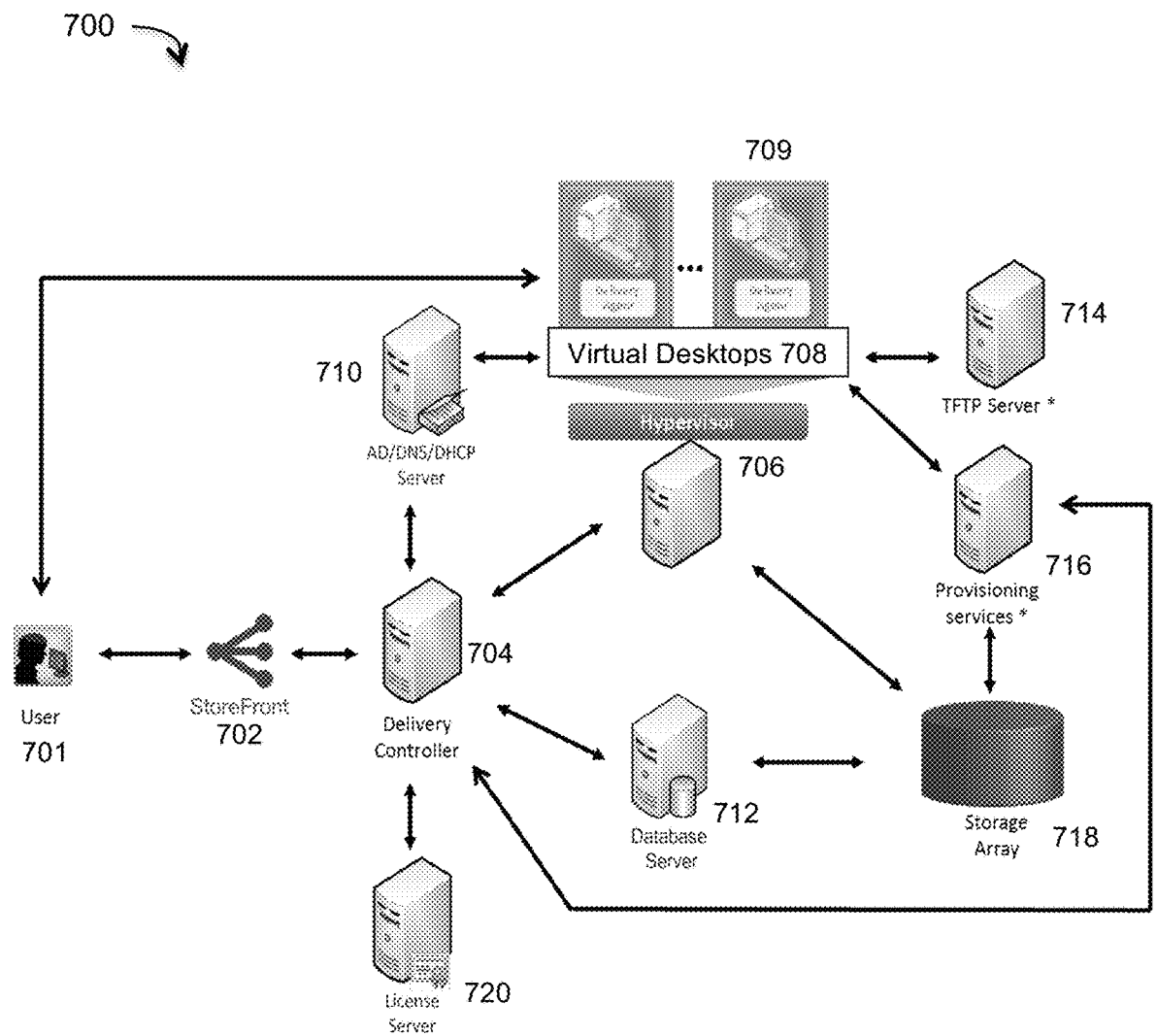
FIG. 7 illustrates an example desktop broker architecture under an alternative embodiment.

FIG. 7 illustrates an example desktop broker architecture under this alternative embodiment. As shown in FIG. 7, the key components of this virtual machine infrastructure (e.g., XenDesktop) with MCS and PVS comprises a receiver component used by user 701 that provides users with quick, secure, self-service access to documents, applications, and desktops from any of the user's devices including smartphones, tablets, and PCs. The receiver provides on-demand access to Windows, web, and software-as-a-service (SaaS) applications. A storefront component 702 provides authentication and resource delivery services for the receiver 701. It enables centralized control of resources and provides users with on-demand, self-service access to their desktops and applications. A delivery controller 704 is installed on servers in the data center, and consists of services that communicate with the hypervisor 706 to distribute applications and desktops 708, authenticate and manage user access, and broker connections between users and their virtual desktops and applications. The delivery controller 704 manages the state of the desktops, starting and stopping them based on demand and administrative configurations. It may also be configured to enable users to install profile management to manage user personalization settings in virtualized or physical Windows environments. A virtual delivery agent (VDA) 709 is installed on server or workstation operating systems, the VDA enables connections for desktops and applications.

In system 700, the AD/DNS/DHCP server 710 provides the following functions: IP addresses to virtual desktops using DHCP, secure communication between users and virtual desktops using active directory, and IP host name resolution using DNS. The database server 712 manages a database that stores all the environment site configuration and session information. For certain implementations, a Microsoft SQL server may be required as a database server, while other implementations may allow the use of other database servers, such as Oracle (though some such as Citrix XenDesktop may only support SQL server databases). In an embodiment, the hypervisor 706 may implement VMware vSphere (or similar program) to host virtual desktops. The storage array 718 provides storage to the database, virtual desktops, and the hypervisor. The TFTP Server 714 is used by the virtual desktop to boot from the network and download the bootstrap file. The bootstrap file has the information to access the PVS server and stream the appropriate desktop image. The provisioning services server 716 is used to stream the desktop image to the virtual desktops. The TFTP server 714 and provisioning services server 716 are components that are only required by PVS. The PVS server has a special storage location called vDisk store that stores all the streaming images. Other components may include a license server 720 that assigns a user or device license to the environment 700. The license server along with other components can be installed on a separate virtual or physical machine.

During backup and restore operations of the system 700 environment, certain virtual desktop infrastructure components require backup in a certain specific order. FIG. 8 is a table that lists the virtual desktop infrastructure components of system 700 that require backup under some embodiments. As shown in Table 800 of FIG. 8, the main infrastructure components to be backed up include the Active/DNS/DHCP server 802 (e.g., corresponding to server 710 in FIG. 7), the database server 804, and the vCenter 806, delivery controller 808, provisioning services 810 comprising the provisioning services database and the provisioning services vDisk. In an embodiment, the order or sequence in which the backup components are backed up is important. Thus, with reference to Table 800, the infrastructure components are backed up such that the active directory, DNS server, and DHCP server are backed up first. These can be backed up as one unit or individual units. Next, the database server 804 is backed up, which is typically a SQL server. After this, the vCenter server is backed up followed by the delivery controller, the provisioning services database, and the provisioning services vDisk, in that order. Full recovery or restoration of the virtual desktop infrastructure components is done in the opposite order of the backup operations just described. For partial-loss recovery, the order is not necessarily important, but rather the grouping of the elements.

With respect to virtual desktop types for the environment of FIG. 7 (e.g., XenDesktop), the MCS provisioning method has both a persistent and non-persistent desktop type, and the PVS provisioning method has both a persistent and non-persistent desktop type.

With respect to certain XenDesktop implementations, when non-persistent desktops are provisioned using MCS or PVS, there is no need to back up individual desktops because of their disposable nature. For MCS, as long as there is a backup for the master virtual machine from which the machine catalog is created, it can be used to regenerate the machine catalog if it becomes corrupted or its machines need to be recreated. For PVS, as long as there is a backup for the master vDisk image, non-persistent desktops can be regenerated by recreating a new set of PVS target devices. When persistent desktops are provisioned using MCS or PVS, the persistent data should be stored on a personal vDisk (PvDisk). In addition to backing up the master virtual machine for MCS or the master vDisk image for PVS, each PvDisk also needs to be backed up in order to save the user's settings for each desktop.

FIG. 9 is a table that illustrates the virtual desktop infrastructure components that require backup based on desktop type for system 700, under some embodiments. As shown in Table 900, there are two desktop types (non-persistent and persistent) for each provisioning method. For the MCS provisioning method 902, for non-persistent desktops, the component requiring backup is the master virtual machine, and for persistent desktops, the components requiring backup are (1) the master virtual machine, and (2) the personal vDisk. For the PVS provisioning method 904, for non-persistent desktops, the component requiring backup is the master vDisk, and for persistent desktops, the components requiring backup are (1) the master vDisk, and (2) the personal vDisk.

With respect to user profiles and data in system 700, a profile management component preserves user profiles and dynamically synchronizes them with a remote profile repository. The profile manager downloads a user's remote profile dynamically when the user logs on to the desktop, and applies personal settings to desktops and applications regardless of the user's login location or client device. All user profiles and home directories should be redirected to file shares that are centrally managed and protected. When these shares reside on NAS devices (e.g., VNX File or Isilon), the backup system with an accelerator node can support file system backup and file-level restore for both platforms. Alternatively, a built-in file system snapshot capability for both platforms to perform file-level restore can be used.

In the backup system, certain sizing considerations must be taken into account to adequately accommodate storage sizes once it is known which VDI components are to be backed up. A number of factors may determine how to size the backup system 100 for an EUC environment, including the type of data, the amount and change rate of data for each data type, the retention period for each data type, the number of connected client agents, and customer RPO and RTO requirements.

Certain guidelines or best practice rules may be implemented to ensure adequate and efficient backup storage sizing. For example, with respect to the type of data in the EUC environment, EUC user data such as home directories or roaming profiles stored on file systems are considered unstructured data that generally yield very good deduplication rates because of the repetitive nature of data across productivity type files. Backing up infrastructure virtual machine images or desktop images might yield a lower deduplication ratio.

With respect to the amount and change rate of data for each data type, the master desktop image is typically more static and grows more slowly than the desktops themselves. After it is configured, it is only updated occasionally. The desktops themselves are frequently updated and modified, and therefore likely to generate a higher change rate and larger data set size.

With respect to the retention period of each data set, longer retention periods produce larger data sets. Determining the retention policies based on the customer's Service-Level Agreement (SLA) can help size the system requirements for an EUC environment. For the number of connected client agents, during configuration, both the capacity requirements and throughput requirements for backup ingestion and data restoration should be considered, as well as the limitation of the number of users and groups (domains) that can be assigned to the system.

With respect to the customer's Recovery Point Objective (RPO) and Recovery Time Objective (RTO), the RPO will determine how often a backup is needed. The RTO should be defined in the planning phase to ensure the data recovery objectives recovery can be successfully met within the defined time period.

In general, the various components of an EUC environment should be protected individually, with consideration given to their roles in the environment. The VDI infrastructure component backup process described herein enables the back up and restore each of the components so that the system as a whole can be protected from failure.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of backing up a virtual desktop environment in a backup system having a backup server, comprising:
    determining, in a first component of the backup server, whether the virtual desktop environment is persistent or non-persistent and implements clone technology to copy an existing virtual machine (VM) to create a separate unique VM that is one of a full clone or a linked clone;
    if the virtual desktop environment is non-persistent, backing up, in a backup component of the backup server, a master image that is used to create non-persistent desktops, and not directly backing up the virtual desktop environment;
    reprovisioning the virtual desktop environment upon recovery of the master image;
    if the virtual desktop environment is persistent, backing up the master image that is used to create non-persistent desktops and virtual storage objects that maintain persistence of an identity of the virtual desktop environment by decoupling user settings and local installed applications from the virtual desktop environment so that only user customization changes require backup in order to minimize the backup size and window to improve performance of the backup system;
    performing the backing up by a sequential ordered process of firstly backing up a database server hosting a database providing data of the master image; secondly backing up a virtual center server serving the virtual desktop environment; thirdly backing up a connection server configured to assign virtual desktops of the virtual desktop environment to respective users; and lastly backing up a composer server configured to manage and configure the virtual desktops based on a provisioning of the composer server, wherein the composer server creates linked clones provisioned as floating user assignment clones using non-persistent desktops requiring no backup, dedicated user assignment clones using assigned persistent desktops requiring backup, or full clones using instantiations of a master VM template requiring backup; and
    enabling a restore in a fixed order of: restoring the composer server, restoring the connection server, restoring the virtual center server, and restoring the database server.

2. The method of claim 1 wherein the non-persistent desktop environment causes customizations of user settings or applications to be lost after user logoff or application restart operations.

3. The method of claim 2 wherein the persistent desktop environment causes the user settings or applications to be preserved even after the user logoff or application restart operations.

4. The method of claim 1 further comprising:
    backing up active directory, domain name service (DNS), and dynamic host configuration protocol (DHCP) servers providing file definitions for data used in the virtual desktop environment.

5. The method of claim 4 wherein the virtual desktop environment is part of a variable length deduplication backup system optimized for end-user computing environments.

6. The method of claim 5 wherein the deduplication backup system includes a Network Data Management Protocol accelerator node and wherein a full backup is performed only during an initial backup session, and subsequent full backups are achieved by requesting incremental data backups.

7. The method of claim 6 wherein the backup system implements a virtual desktop broker configured to provide users with personalized virtual desktops in the virtual desktop environment, and comprises components including the virtual center server, the connection server, and the composer server.

8. The method of claim 6 wherein the backup system implements a virtual center server having two provisioning methods to provision virtual desktops within the virtual desktop environment including a machine creation services (MCS) method and a provisioning services (PVS) method.

9. The method of claim 8 further comprising:
    if the virtual desktop environment is non-persistent and the provisioning method is MCS, backing up a master virtual machine;
    if the virtual desktop environment is persistent and the provisioning method is MCS, backing up the master virtual machine and a personal virtual disk;
    if the virtual desktop environment is non-persistent and the provisioning method is PVS, backing up the master virtual disk; and
    if the virtual desktop environment is persistent and the provisioning method is PVS, backing up the master virtual disk and the personal virtual disk.

10. A computer program product, comprising a non-transitory computer-readable medium having a computer-readable program code embodied therein, the computer-readable program code adapted to be executed by one or more processors to perform backups of a virtual desktop environment in a backup system having a backup server and further having persistent and non-persistent virtual desktop infrastructure components, database storage components, and file management components, by executing instructions implementing a method comprising:
    determining, in a first component of the backup server, whether the virtual desktop environment is persistent or non-persistent and implements clone technology to copy an existing virtual machine (VM) to create a separate unique VM that is one of a full clone or a linked clone;

if the virtual desktop environment is non-persistent, backing up, in a backup component of the backup server, a master image that is used to create non-persistent desktops, and not directly backing up the virtual desktop environment;

reprovisioning the virtual desktop environment upon recovery of the master image;

if the virtual desktop environment is persistent, backing up the master image that is used to create non-persistent desktops and virtual storage objects that maintain persistence of an identity of the virtual desktop environment by decoupling user settings and local installed applications from the virtual desktop environment so that only user customization changes require backup in order to minimize the backup size and window to improve performance of the backup system;

performing the backing up by a sequential ordered process of firstly backing up a database server hosting a database providing data of the master image; secondly backing up a virtual center server serving the virtual desktop environment; thirdly backing up a connection server configured to assign virtual desktops of the virtual desktop environment to respective users; and lastly backing up a composer server configured to manage and configure the virtual desktops based on a provisioning of the composer server wherein the composer server creates linked clones provisioned as floating user assignment clones using non-persistent desktops requiring no backup, dedicated user assignment clones using assigned persistent desktops requiring backup, or full clones using instantiations of a master VM template requiring backup; and enabling a restore in a fixed order of: restoring the composer server, restoring the connection server, restoring the virtual center server, and restoring the database server.

11. The computer program product of claim 10 wherein the non-persistent desktop environment causes customizations of user settings or applications to be lost after user logoff or application restart operations.

12. The computer program product of claim 11 wherein the persistent desktop environment causes the user settings or applications to be preserved even after the user logoff or application restart operations.

13. The computer program product of claim 10, wherein the method further comprises:

backing up active directory, domain name service (DNS), and dynamic host configuration protocol (DHCP) servers providing file definitions for data used in the virtual desktop environment.

14. The computer program product of claim 13 wherein the deduplication backup system includes a Network Data Management Protocol accelerator node and wherein a full backup is performed only during an initial backup session, and subsequent full backups are achieved by requesting incremental data backups, and wherein the backup system implements a virtual desktop broker configured to provide users with personalized virtual desktops in the virtual desktop environment, and comprises components including the virtual center server, the connection server, and the composer server.

* * * * *